(12) United States Patent
Pirzada et al.

(10) Patent No.: US 8,050,707 B2
(45) Date of Patent: Nov. 1, 2011

(54) METHOD FOR SELECTING A PRIORITY FOR WIRELESS TECHNOLOGIES VIA GRAPHICAL REPRESENTATION

(75) Inventors: Fahd B. Pirzada, Austin, TX (US);
Pratik M. Mehta, Austin, TX (US);
Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 642 days.

(21) Appl. No.: 11/701,704

(22) Filed: Feb. 2, 2007

(65) Prior Publication Data

US 2008/0188206 A1 Aug. 7, 2008

(51) Int. Cl.
*H04M 1/00* (2006.01)
(52) U.S. Cl. ............... 455/552.1; 455/553.1; 455/452.2; 455/414.1
(58) Field of Classification Search ............... 455/414.1, 455/418, 566, 552.1–553.1
See application file for complete search history.

(56) References Cited

U.S. PATENT DOCUMENTS

| | | | |
|---|---|---|---|
| 6,122,514 A * | 9/2000 | Spaur et al. ............... 455/448 | |
| 6,351,499 B1 | 2/2002 | Paulraj et al. | |
| 7,065,367 B2 * | 6/2006 | Michaelis et al. ......... 455/452.2 | |
| 7,085,290 B2 | 8/2006 | Cain et al. | |
| 7,146,166 B2 | 12/2006 | Backes et al. | |
| 7,221,957 B2 * | 5/2007 | Takamura et al. ......... 455/550.1 | |
| 7,519,364 B2 * | 4/2009 | Nair et al. .................. 455/432.1 | |
| 7,555,324 B2 * | 6/2009 | Uotsu et al. ................ 455/575.7 | |
| 2002/0065076 A1 * | 5/2002 | Monroe ........................ 455/426 | |
| 2002/0069284 A1 | 6/2002 | Slemmer et al. | |
| 2003/0083026 A1 * | 5/2003 | Liu ............................. 455/127 | |
| 2003/0100328 A1 * | 5/2003 | Klein et al. ................. 455/522 | |
| 2005/0176420 A1 * | 8/2005 | Graves et al. ............... 455/424 | |
| 2005/0239497 A1 * | 10/2005 | Bahl et al. .................. 455/552.1 | |
| 2006/0116179 A1 * | 6/2006 | Vensuna ...................... 455/574 | |
| 2006/0274750 A1 * | 12/2006 | Babbar et al. ............... 370/390 | |
| 2007/0004444 A1 * | 1/2007 | Klein et al. ................. 455/522 | |
| 2007/0082660 A1 * | 4/2007 | Smith et al. ................ 455/418 | |
| 2007/0099567 A1 * | 5/2007 | Chen et al. ................. 455/41.2 | |
| 2007/0155381 A1 * | 7/2007 | Alberth et al. ............. 455/432.1 | |
| 2007/0214412 A1 * | 9/2007 | Arquie et al. ............... 715/526 | |
| 2007/0253395 A1 * | 11/2007 | Graves et al. ............... 370/338 | |
| 2007/0287399 A1 * | 12/2007 | Lee ............................. 455/226.2 | |
| 2008/0009324 A1 * | 1/2008 | Patel ........................... 455/566 | |
| 2008/0113661 A1 * | 5/2008 | Repka ......................... 455/418 | |
| 2008/0130599 A1 * | 6/2008 | Horikoshi et al. .......... 370/338 | |
| 2008/0134070 A1 * | 6/2008 | Kobayashi et al. ......... 715/767 | |
| 2008/0188206 A1 * | 8/2008 | Pirzada et al. .............. 455/414.1 | |
| 2009/0054068 A1 * | 2/2009 | Halkka et al. ............... 455/445 | |

\* cited by examiner

*Primary Examiner* — Jean Gelin
*Assistant Examiner* — Nathan Taylor
(74) *Attorney, Agent, or Firm* — O'Keefe, Egan, Peterman & Enders LLP (57) ABSTRACT

Methods and systems are disclosed for selecting performance settings for one or more wireless technologies, presenting a graphical representation of the relative performance of the wireless technologies for each performance setting, and allowing a selection of at least one of the performance settings. The performance settings can be associated with wireless technologies, or location types. Performance characteristics may include noise, power, quality, speed, and interference. The performance setting of one wireless technology may be manually adjusted and the impact on other wireless technologies can be a graphical displayed or numerical display. Adjustments can be made by a user or a platform designer. In a preset mode, a user make select between preset performance settings that are graphically displayed. In an advanced mode, adjustments to wireless performance characteristics of all the wireless interfaces on a specific platform may be selectively made with the relative effects on other wireless interfaces graphically displayed.

26 Claims, 5 Drawing Sheets

METHOD FOR SELECTING A PRIORITY FOR WIRELESS TECHNOLOGIES VIA GRAPHICAL REPRESENTATION

TECHNICAL FIELD OF THE INVENTION

The present disclosure relates to a method of selecting a priority for one or more wireless technologies, and particularly to presenting a graphical representation of relative performance of technologies for each performance setting.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Numerous competing and wireless technologies and applications are available for mobile use. Devices and platforms enabled with multiple sets of these wireless technologies may not provide the best user experience in terms of target application performance. Wireless technologies that may be integrated into portable information handling systems (one example being notebook computers) or include Wi-Fi (802.11 based technologies), Bluetooth (BT), ultra-wide band (UWB), Cellular, wide area network (WAN), Mobile WiMax, DVB-H, RFID, GPS, others, etc. While mobility and wireless Internet access are becoming mainstream, several factors impacting system performance are the simultaneous operation of multiple wireless technologies, multiple spectrum overlaps, interference/co-existence, smaller form factors driving antenna size and designs, power and battery life performance tradeoffs, system performance tradeoffs and driver overhead, and high bandwidth applications. One challenge experienced by users is in optimizing performance attributes of wireless options relative to application use cases. A method is needed that dynamically models and adjusts performance of a system for mobile wireless use relative to other attributes of the system by abstracting user experience feature requirements.

Figure 1:
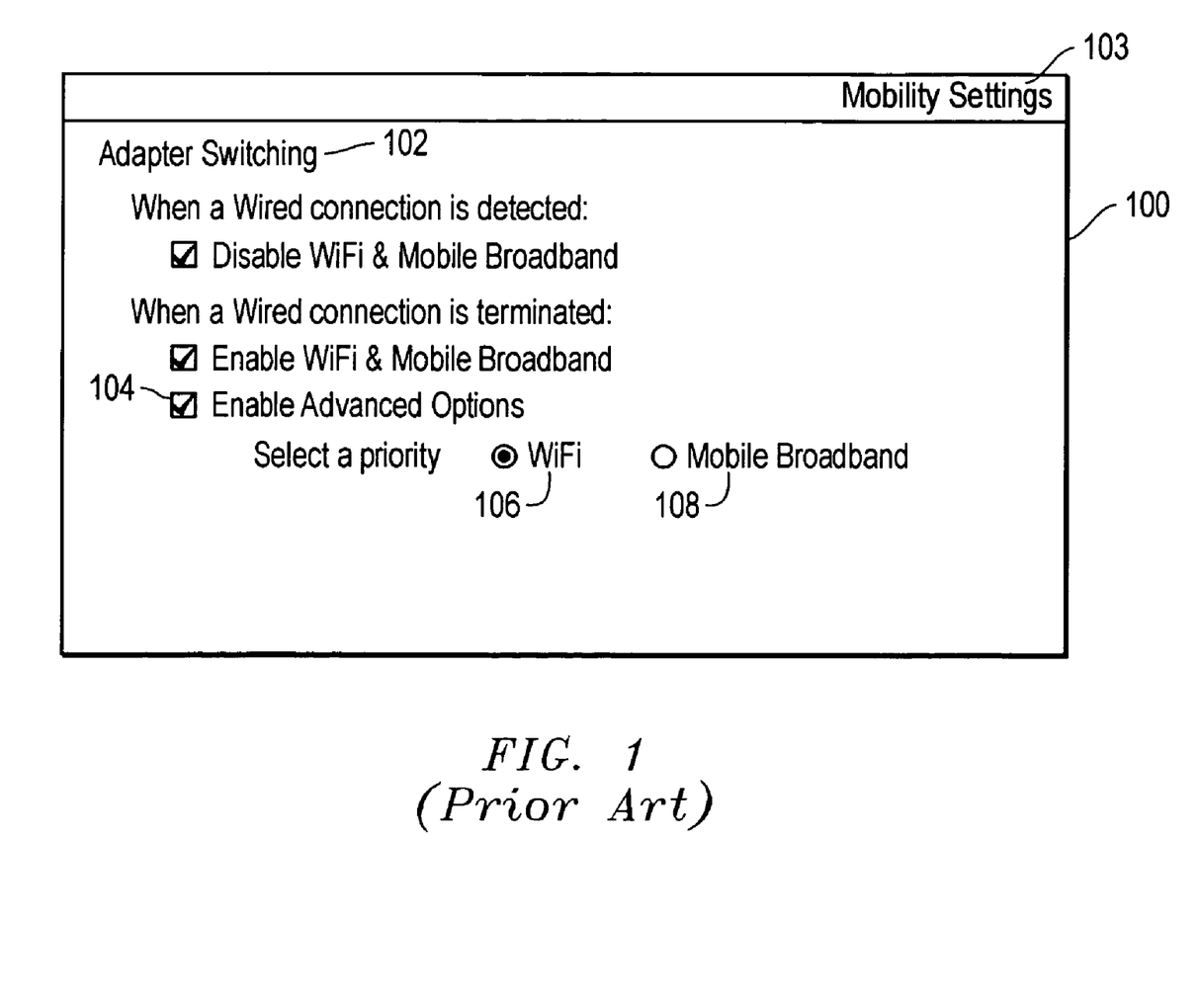
FIG. 1 is an illustrative diagram of Quickset application.

Some information handling systems incorporate software-based wireless profile management, which focuses on wireless and location profiles to help a user switch between profiles and manage them for WiFi, Cellular, etc. and the like. For example, FIG. 1 shows a portion of a screen of the Dell Quickset location profiler 100. Dell Quickset location profiler is software-based wireless profile management tool that ships with Dell notebook computers. Adapter Switching 102 is a mobility setting 103 that provides options regarding wireless technologies that impact power and performance of a system. For example, user check boxes are provided for a user to select various modes of operation. One option allows wireless features to be disabled when a wired connection is detected. Other options may relate to modes that may be selected when the wired connection is terminated. For example, when a wired connection is terminated, the wireless features may be optionally automatically enabled. Another option, Enable Advanced Options 104, allows relative prioritization of WiFi 106 and Mobile Broadband 108. Thus, when using the Adapter Switching 102 option, a various modes relating to wired Ethernet, WiFi, and Mobile Broadband can be selected and the modes can include a prioritization of wireless standards.

Another current art method is Quickset Location and Mobility Management technology. A location profiler can be used to create and manage profiles for different places a user uses a computer, such as an office, home, or favorite coffee shop. A profile is created for a particular network. The network can be affiliated with a location, such as an office, home, or other locations. When the computer is moved from one place to another, a user can switch to a saved profile to change settings for the user's Internet browser, applications, wireless network connection standard, shared folders, and printers. When a user selects a location, its affiliated network is activated. A user can add a network profile to the user's location profile by adding a network profile name and network type, then selecting the manage network profiles option. User selections are made via a graphical user interface. A WiFi Manager and Mobile Broadband Manager are available once the wireless networks are configured using a wireless manager before adding them to the user's location profile. The user can create a location profile name and can lock in the profile. The user can then save the profile setting. The concept of Quickset Location and Mobility Management is targeted towards providing more control over location based settings and network transition rules. The location profiles allow configuration of browser, printer, VPN, firewall settings, and the like, for network connections. The mobility settings provide additional configuration of adapter switching and client manager software. While the current art Quickset features provide the user more control, they do not provide the user the necessary information to optimize and tailor the performance of their wireless interfaces. A method is needed to provide an application capable of showing and managing the performance for all wireless interfaces on a platform.

SUMMARY OF THE INVENTION

The present disclosure provides a method of selecting a priority for one or more wireless technologies. It presents a graphical representation of relative performance of a plurality of wireless technologies for each performance setting. A selection of at least one of the performance settings is allowed. In an exemplary embodiment, the performance settings are provided for each available wireless technology. The performance settings may be associated with specific user applications or physical locations.

In one embodiment, a method of selecting a performance setting for one or more wireless technologies is provided. The method may include providing a plurality of wireless technology interfaces, presenting a visual representation of relative performance of the plurality of wireless technology interfaces for each of a plurality of groupings of performance settings and allowing a selection of at least one of the groupings of performance settings.

In another embodiment, a method of adjusting performance characteristics of a plurality of wireless technologies within an information handling system is provided. The method may include providing a plurality of wireless technology interfaces, adjusting manually a relative performance characteristic of at least a first wireless technology interface and graphically displaying relative changes in the performance characteristics of one or more other wireless technology interfaces that results from the manual adjustment of the at least first wireless technology interface.

In another embodiment, an information handling system for selecting a priority for one or more wireless technology interfaces is disclosed. The system may include a plurality of wireless technology devices and a plurality of different wireless performance settings each performance setting including the relative performance characteristics for a plurality of the wireless technology devices. Further the system may include a graphical interface capable of displaying a graphical representation of the relative performance characteristics for a plurality of performance settings and a selection mode which allows the selection at least one of the performance settings.

In another embodiment, an apparatus for adjusting the wireless performance characteristics of an information handling system is disclosed. The system may include a plurality of wireless technology network interfaces, an interface capable of displaying a representation of relative performance characteristics of the wireless technology interfaces. Further, the system may include an adjustment mechanism which allows for the adjustment of the performance characteristics of at least a first one of the wireless technology interfaces, wherein the effect of the adjustment of the performance characteristics of at least a first one of the wireless technology interfaces on the performance characteristics of at least one other wireless technology interface is also displayed on the interface Further, a method of adjusting performance characteristics of a plurality of wireless technologies within an information handling system is provided. Wireless technologies are provided and a user manually may adjust a relative performance characteristic of a wireless technology and the impact of this manual adjustment on wireless technologies is displayed. Performance characteristics may relate to noise, power, quality (semiconductor process technology, architecture, RF performance, etc.), speed, and/or interference. While in an exemplary embodiment, the displaying is via a graphical display, a numerical display may alternatively be used. As described below, other features and variations can be implemented, if desired, and related systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present disclosure provides systems and methods for selecting a priority for one or more wireless technologies. A plurality of wireless technologies is provided, and a graphical representation of the relative performance of the technologies is presented for each performance setting. A selection of at least one of the performance settings is allowed. In an exemplary embodiment, the performance settings are provided for each available wireless technology. Thus, the desired performance for a particularly wireless technology may be selected from a low to high performance range. Prioritizing one wireless technology may however impact the performance of other wireless technologies that are available in the system. Thus, a graphical representation of the relative performance of the other wireless technologies may be also displayed so that as the performance setting of one wireless technology is changed the relative effect the performance selection of the particularly selected wireless technology has upon the other wireless technologies may also be displayed. Thus, the relative impact of performance changes may be easily ascertained in a convenient visual manner.

Figure 2:
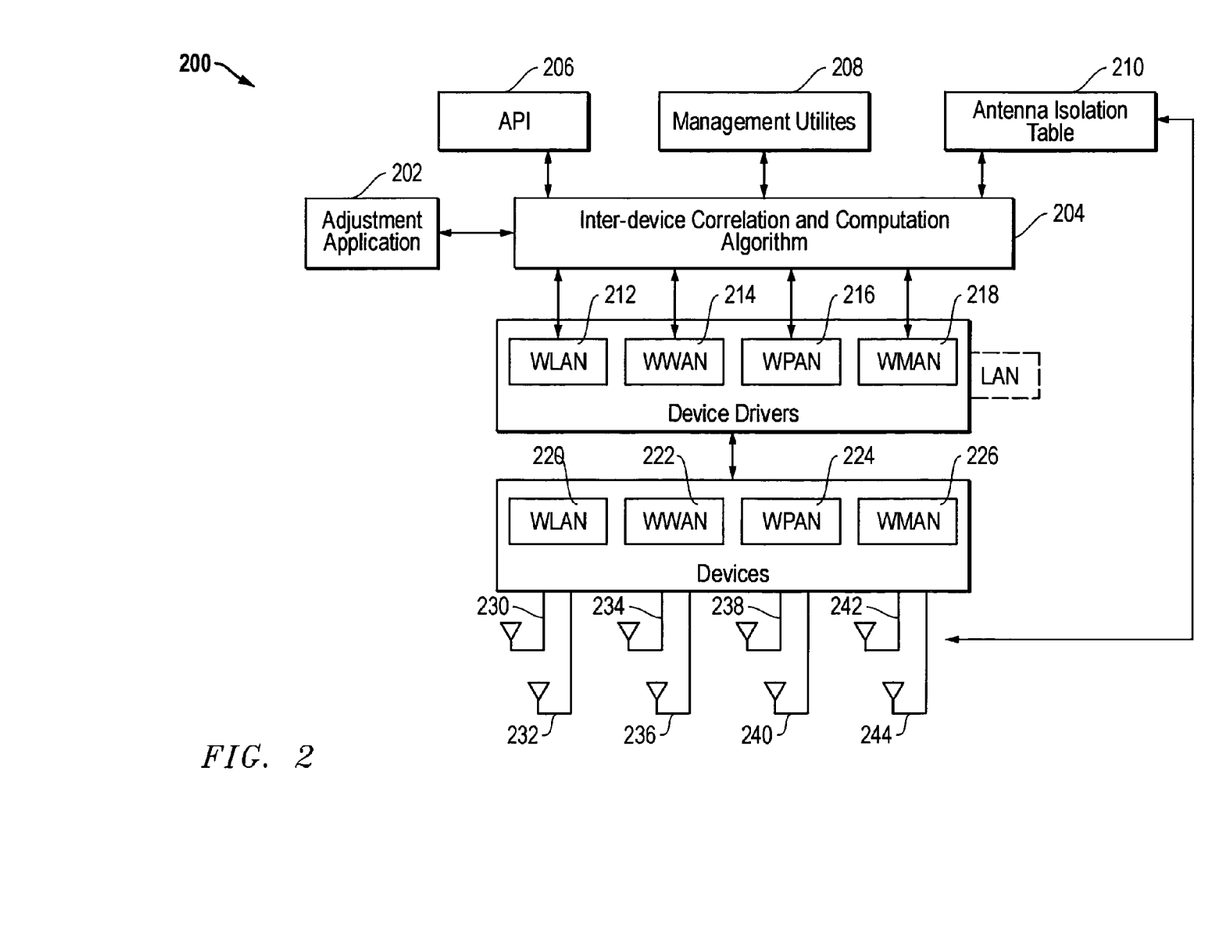
FIG. 2 is a block diagram of a architecture stack for a platform with a wireless performance management application.

FIG. 2 shows a block diagram of a platform wireless performance management application in a system 200 that includes multiple wireless technologies. For example, as shown in FIG. 2, the system 200 may include a plurality of wireless RF radio devices 220-226, each associated with a different wireless technology. For example, WLAN device 220 (one example being 802.11 technologies), WWAN device 214 (one example being cellular technologies), WPAN device 224 (one example being Bluetooth technologies) and a WMAN device 226 (one example being 802.16 technologies such as WiMax). It will be recognized that the techniques described herein are applicable to a wide range of wireless technologies and not limited to the particular examples describe herein. Thus, other types of devices may be utilized including future developed technologies. Further, the techniques described herein are not limited to RF based technologies and other wireless technologies such as optical technologies or those using other frequencies may be applicable.

Associated with the wireless devices 220-226 may be a plurality of wireless antennae 230-244. As shown, a plurality of antennae is associated with each wireless device, for example antennae 230 and 232 are associated with wireless device 220. It will be recognized that the particular antennae associates shown in FIG. 2 are merely exemplary. For example, a single antenna or multiple antennas may be associated with a given wireless device. Further, an antenna may be shared by multiple devices. Similarly, an antenna may be reconfigurable for a specific set of devices. The techniques described herein however are independent of such antennae choices. A plurality of device drivers 212-218 may also be associated with the wireless devices 220-226 as is known in the art.

An inter-device correlation and computation algorithm 204 is also provided as shown coupled between the device drivers 212-218 and the API 206 and management utilities 208. The inter-device correlation and computation algorithm determines the relationship between the characteristics that result from utilizing various combinations of wireless devices. For example, the performance of the overall system and the individual wireless technologies may be impacting by the simultaneous operation of multiple wireless technologies, multiple spectrum overlaps, interference/co-existence, power and battery life performance tradeoffs, system performance tradeoffs and driver overhead, bandwidth availability, etc. In addition, antennae interaction and isolation between antennae may be highly variable for the particular antennae hardware design, shape and size of a given system. A given system may have the interaction and isolation effects of various wireless combinations stored in the antenna isolation table 210. The inter-device correlation and computation algorithm 204 may consider the various factors affecting system and wireless performance including input from the antenna isolation table 210 in order to relative performance determinations. Coupled to the inter-device correlation and computation algorithm 204 is an adjustment application 202. As will be described in more detail below, the adjustment application 202 allows for a desired performance setting, wireless technology or application to be selected for one or more wireless technologies. In one embodiment, the adjustment parameters may then be provided to the inter-device correlation and computation algorithm 204 so that the corresponding performance response affects on the other wireless technologies may be determined and/or illustrated. In one embodiment, the adjustment may merely be the selection of a particular application or location by a user or in a more advanced embodiment the adjustment may allow for the adjustment of the performance of one or more particular wireless technologies. A user can choose to optimize one wireless link and see a graphical representation of the effects on other wireless interfaces available on the platform.

It will be noted that the inter-device wireless correlations and interactions may vary widely from system to system. Further, the characteristics of various wireless devices of the same technology type may be variable based upon the particular manufacturer of the wireless device. Thus, it will be recognized that any particular correlation may be system dependent and that the concepts described herein are not based upon any particular correlation algorithm.

Figure 3:
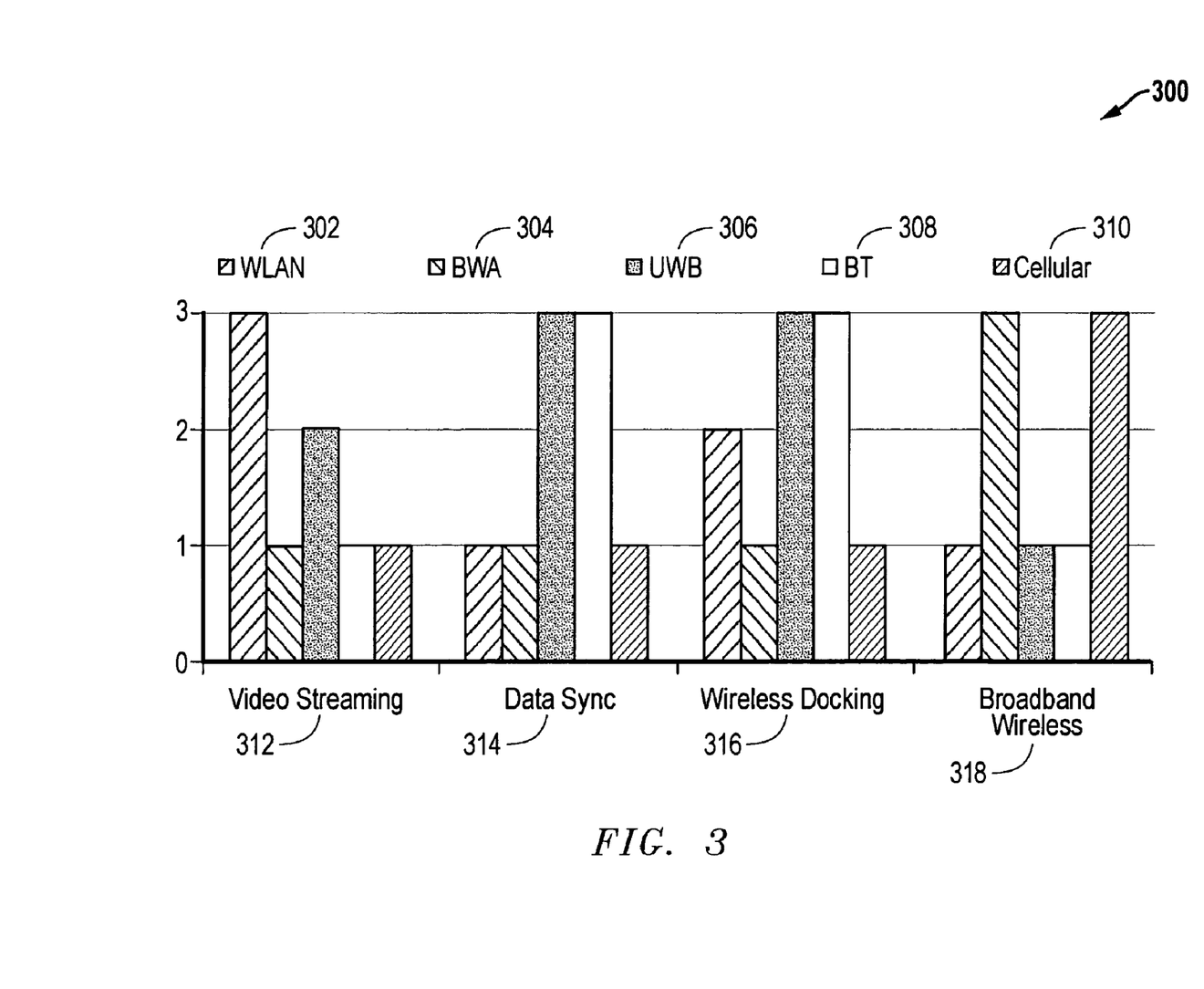
FIG. 3 is a block diagram of a preset mode with a graphical representation.

FIG. 3 shows one embodiment of the techniques described herein illustrating a preset mode of operation with a graphical representation 300. The preset mode allows a user to choose from several pre-configured wireless performance settings, based on application requirements. For example, as shown exemplary applications could include video streaming 312, Data Sync 314, wireless docking 316, and broadband wireless 318 (it will be recognized that a wide range of other applications could be utilized). Further, for each application the relative performance of the wireless technologies (such as WLAN 302, BWA 304, UWB 306, BT 308, and cellular 310) is shown on a representative scale of one to three (one being low performance and three being high performance). Thus, as shown in FIG. 3 associated with each application is a group or set of relative performance settings or characteristics. For example, the preset mode for the wireless docking application would maximize the performance of the UWB interface 306, so that high bandwidth applications like uncompressed video cable replacement can be supported. Similarly the other preset modes would automatically choose the best possible optimizations for other wireless interfaces.

In FIG. 3, the preset mode displays the graphical representation of the relative performance of wireless interfaces on a bar chart for the various selectable applications. This chart helps the users to visualize the effect of various preset modes, and also aids the user in selecting between presets. The graphical representation may be based upon the underlying inter-device interactions and correlations for a particular system and shows the mutual interaction between various wireless devices on given system.

In an alternative embodiment, the graphical representation of the relative performance of various wireless technologies may be adjusted. For example, graphical representation such as a bar graph may be adjusted so that the performance of a given wireless device may be manually moved up or down. The change in the performance of one wireless device may then cause an increase or decrease in the illustrated performance of the other wireless devices. In this manner, the relative changes caused by increasing or decreasing the performance of one wireless device may be illustrated. Such effects may be illustrated in a wide range of graphical manners. Exemplary graphical techniques include the bar graphs of FIG. 3 or the sliders shown with respect to FIG. 4, however, it will be recognized that any of wide variety of graphical techniques (including mere listings of the performance in some alphanumeric manner) may be utilized.

The ability to visually see the relative impact of different priority levels of the various wireless devices may be particularly useful for a platform developer. In one example, a platform developer may be establishing the various preset performance levels that are associated with particular applications such as shown in FIG. 3. In an exemplary embodiment, the adjustable graphical mode allows a platform developer to tweek wireless performance characteristics of the wireless interfaces on a specific platform. The advanced mode provides the platform developer control to make certain optimization needed for each preset while visually seeing the overall effect on a plurality of the wireless devices.

Figure 4:
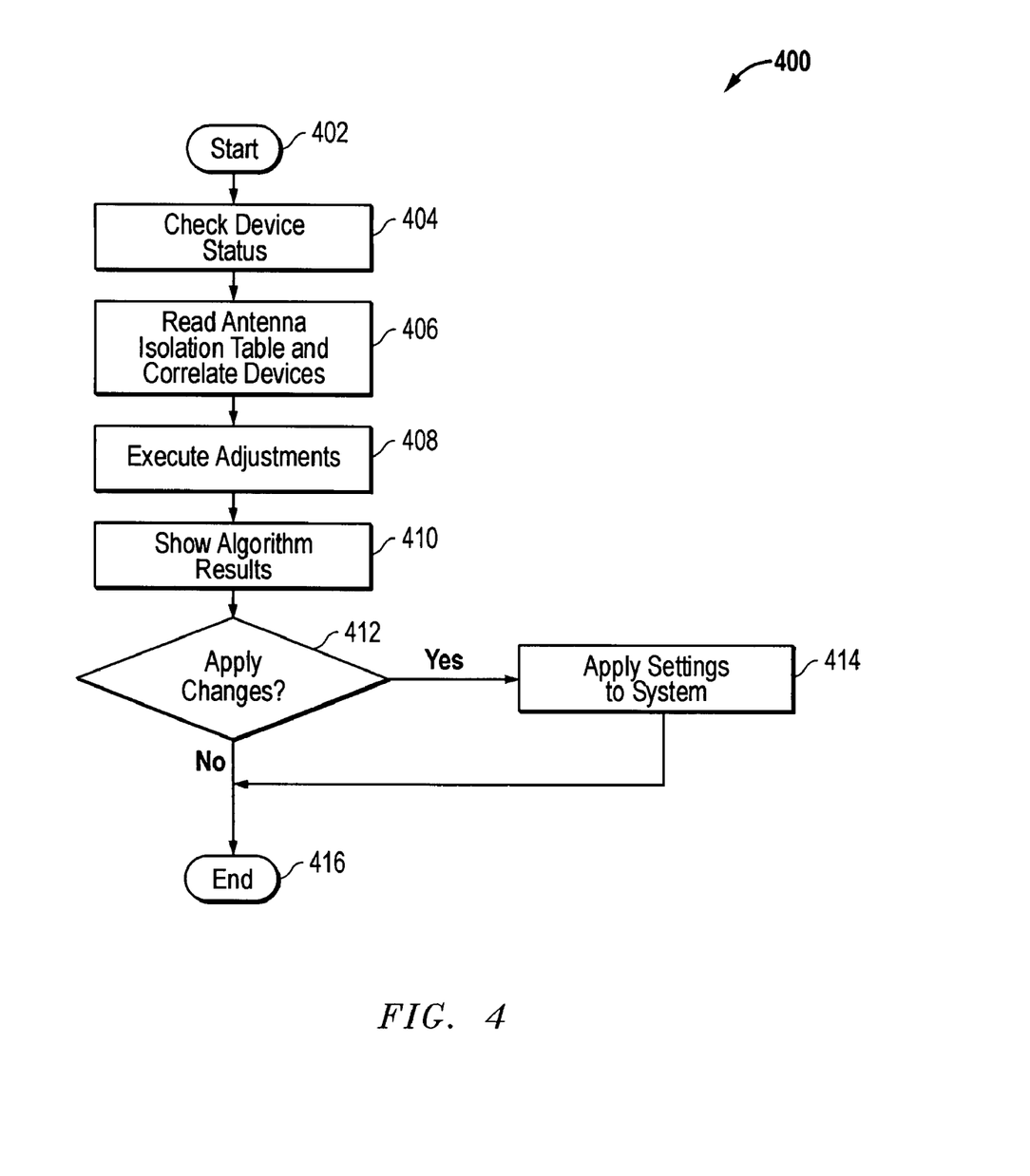
FIG. 4 is a flowchart of the steps involved for the preset mode of selecting a priority for wireless technologies.

FIG. 4 shows a flowchart 400 of exemplary steps involved for adjustable setting the priority. The process begins at step 402. The status of the wireless devices is checked at step 404. An antenna isolation table is checked to and the inter-device correlation is established at step 406. Adjustments to the performance settings may then be made at step 408. In step 410, the various inter-device performance factors and algorithms may then be considered to graphically display the performance changes that result from the adjustment of step 408. At step 412, if the resulting effects are satisfactory the changes may then be applied to the system. If the changes appear to be undesirable, the changes do not have to be applied and control moves to the end step 416.

In one embodiment, the techniques of FIG. 4 may be utilized by a platform developer to assist in the establishment of preset performance settings such as shown in FIG. 3. In another embodiment, the techniques of FIG. 4 may be available to end user's to independently adjust the settings affiliated with particular applications, locations or the system as a whole. Thus, while the adjustment mode is described herein at times with regard to a designer using mode, it is understood that an end user could also have access to and use the adjustment mode.

Figure 5:
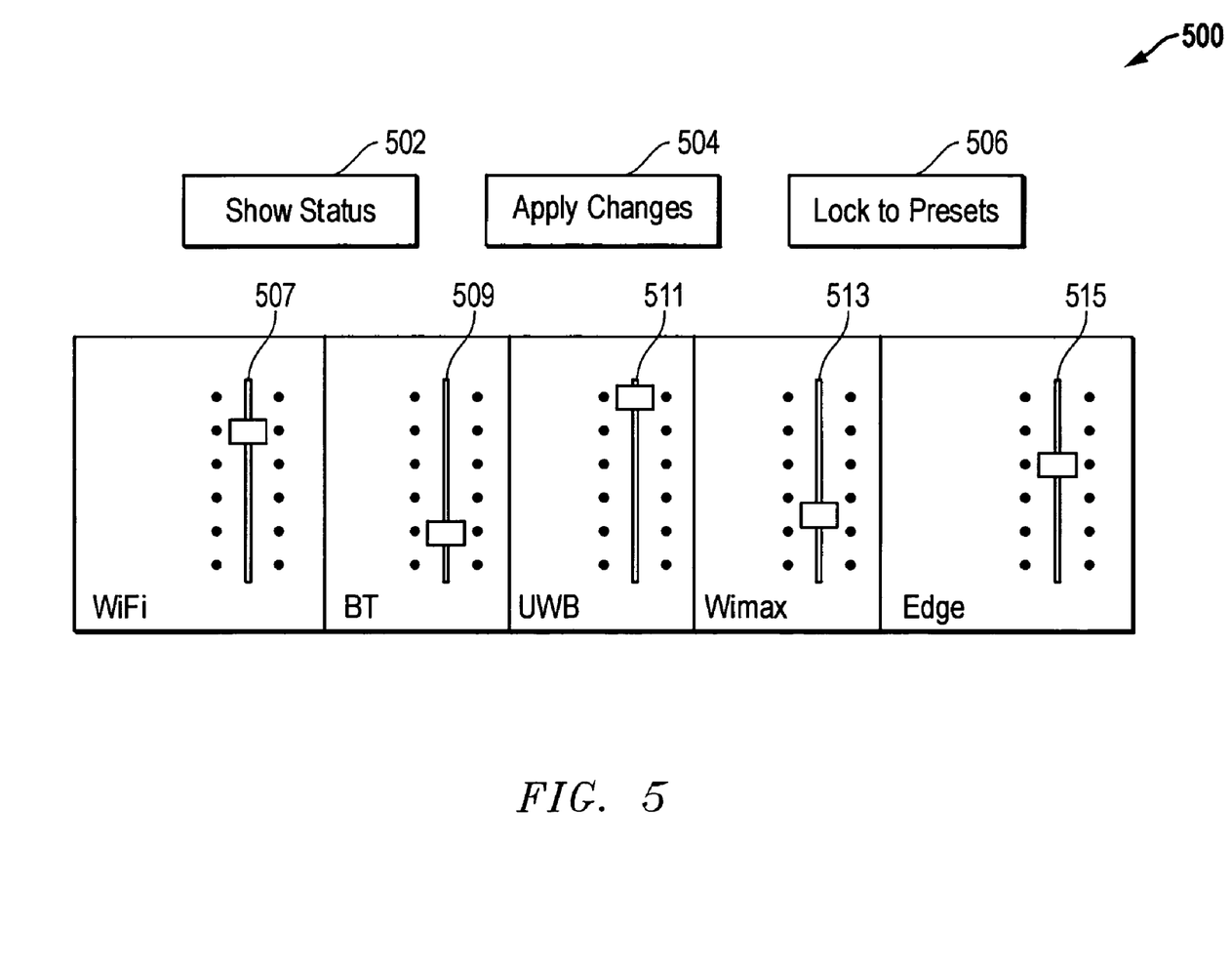
FIG. 5 is a diagram of a graphical representation of real-time performance of multiple wireless interfaces.

FIG. 5 shows an exemplary diagram graphical mode to adjust the performance settings for the wireless technologies using graphical sliders. Various option functions are provided such as show status 502 which will display the current performance settings of the system, apply changes 504 which may be used to apply any changes that are made, and lock to presets 506 which may be used to save the settings as preset settings. Wireless technology adjustment mechanisms are provided as sliders 507, 509, 511, 513, and 515 which correlate to relative performance settings for WiFi, BT, UWB, WiMax, and EDGE as shown. It is understood that more or less than the adjustment mechanisms shown in FIG. 5 may exist for a system. As shown, a scale of relative performance is illustrated. Performance quality may be objective and can be based upon such features as power, noise, interference, signal quality, speed, and the like. These features can fluctuate from system to system, and within one system in various locations.

This device interaction is shown graphically using the sliders that can be used to make network performance projections. Manually changing a slider setting for one network interface will cause the other sliders to move up or down so as to show the relative impact of the manual change on one wireless network interface on other wireless network interfaces present in the platform. For example, a Bluetooth link operating at full performance may impair the performance of the 802.11 g link. A designer or end user can see the effects of a particular setting and optimize settings accordingly. As mentioned above, the interaction between various network technologies may be platform specific, antenna specific, driver specific, application specific, etc.

Thus, an exemplary operation of the graphical adjustment mechanism of FIG. 5 may include the Show Status 502 button first being selected to poll all the wireless devices. Next one or more of the adjustment mechanisms or sliders 507, 509, 511, 513, and 515 may be moved up or down to see the projected performance impact on the other wireless devices. When the desired performance characteristics are obtained, the apply Changes button 504 may be push so that these changes are provided to the actual devices. When satisfied with the changes, the Lock to Presets button 506 may be selected to save the changes.

Thus, FIG. 5 shows the graphical representation of the real-time performance of multiple network interfaces that may result from a variety of factors both internal and external to the system that influence the performance of wireless devices. Since real-time feedback is provided to a user, these factors may be monitored and their interaction with multiple wireless devices is displayed. The various wireless devices may then be controlled according to the selected performance settings.

Though some embodiments are described herein with reference to a graphical representation of wireless technologies, the graphical representation may alternatively list different types of user applications (for example, data transfer, multimedia transfers, high security transfers, broadband wireless, etc.). The user may then select the type of application that is desired to have selected performance settings. The available methods for selecting a performance setting may then be used to associate this application with the appropriate corresponding wireless technology settings (for example high bandwidth multi-media transfers may be designated to correlate to one wireless technology while high security data transfers may be designated to correlate to a different wireless technology, etc.). In yet another alternative, the performance settings could be graphically shown as location types with once again underlying software correlating the location types to particular wireless technologies. Thus, various wireless technologies may be prioritized and the impact of the prioritization may be graphically displayed even though the actually wireless technology types are not graphically listed on a screen but rather some surrogate (such as application or location) is graphically listed.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method of selecting a performance setting for one or more wireless technologies, comprising:
    providing a plurality of wireless technology interfaces, wherein the wireless technology interfaces correspond to differing wireless protocols, the plurality of wireless technology interfaces comprising at least one of a WiFi interface, 802.11 based interface, Bluetooth interface, ultra-wide band interface, cellular interface, wide area network interface, Mobile WiMax interface, DVB-H interface, RFID interface, GPS interface or other wireless protocol interface;
    providing a plurality of data applications, each of the wireless technology interfaces being associated with multiple of the data applications,
    providing, for each data application, a grouping of data application performance settings corresponding to a performance of each of the wireless technology interfaces for the corresponding data application, wherein the groupings of performance settings represent performance characteristics of the wireless technology interfaces for a particular data application;
    simultaneously presenting a visual representation of a relative performance of the plurality of wireless technology interfaces by displaying the groupings of performance settings representing performance characteristics for each of the data applications; and
    allowing a selection of at least one of the groupings of performance settings.

2. The method of claim 1, wherein the relative performances within the groupings of performance settings are automatically generated for a user.

3. The method of claim 1, wherein the relative performances within the groupings of performance settings are user adjustable.

4. The method of claim 1, wherein the groupings of performance settings are associated with a usage application.

5. The method of claim 1, wherein the groupings of performance settings are associated with a location.

6. The method of claim 1, wherein the groupings of performance settings are preset modes.

7. The method of claim 6, wherein the groupings of performance settings are associated with an application.

8. The method of claim 1, wherein the visual representation includes alphanumeric representation of the relative performance.

9. The method of claim 1, wherein the visual representation includes graphical representation of the relative performance.

10. A method of adjusting performance characteristics of a plurality of wireless technologies within an information handling system, comprising:
provided a plurality of wireless technology interfaces, wherein the wireless technology interfaces correspond to differing wireless protocols, the plurality of wireless technology interfaces comprising at least one of a WiFi interface 802.11 based interface, Bluetooth interface, ultra-wide band interface, cellular interface, wide area network interface, Mobile WiMax interface, DVB-H interface, RFID interface, GPS interface or other wireless protocol interface;
providing a plurality of data applications, each of the wireless technology interfaces being associated with multiple of the data applications,
adjusting manually a relative performance of at least a first wireless technology interface, the performance being adjustable and being based upon at least one of power, noise, interference and signal quality; and
simultaneously displaying relative changes in the performance of one or more other wireless technology interfaces that results from the manual adjustment of the at least first wireless technology interface.

11. The method of claim 10, wherein said displaying is a graphical display.

12. The method of claim 10, wherein said displaying is an alphanumerical display.

13. The method of claim 10, further comprising utilizing the graphical displaying of the relative changes in the performance to establish a preset mode of the information handling system.

14. The method of claim 13, wherein the method is available to a platform designer.

15. The method of claim 10, wherein the method is available to an end user.

16. An information handling system for selecting a priority for one or more wireless technology interfaces, comprising:
a plurality of wireless technology devices, wherein the wireless technology interfaces correspond to differing wireless protocols, the plurality of wireless technology interfaces comprising at least one of a WiFi interface 802.11 based interface, Bluetooth interface, ultra-wide band interface, cellular interface, wide area network interface, Mobile WiMax interface, DVB-H interface, RFID interface, GPS interface or other wireless protocol interface;
a plurality of data transfer applications, each of the wireless technology interfaces being associated with multiple of the data transfer applications,
a plurality of different wireless performance settings, wherein a wireless performance setting is provided for each data transfer application, wherein each wireless performance setting represents the performance for the plurality of wireless technology devices for a given particular data transfer application, each performance setting including the relative performance characteristics for a plurality of the wireless technology devices;
a graphical interface capable of simultaneously displaying a graphical representation of the relative performance characteristics for a plurality of performance settings; and
a selection mode which allows the selection at least one of the performance settings.

17. The system of claim 16, wherein the performance characteristics within the plurality of performance settings are automatically generated for a user.

18. The method of claim 16, wherein the performance characteristics within the plurality of performance settings are user adjustable.

19. The system of claim 18, wherein the performance settings are usage applications.

20. The system of claim 18, wherein the performance settings are locations.

21. The system of claim 18, wherein the relative performance characteristics relate to noise, power signal quality, speed or interference characteristics.

22. An apparatus for adjusting the wireless performance characteristics of an information handling system, comprising:
a plurality of wireless technology interfaces, wherein the wireless technology interfaces correspond to differing wireless protocols, the plurality of wireless technology interfaces comprising at least one of a WiFi interface, 802.11 based interface, Bluetooth interface, ultra-wide band interface, cellular interface, wide area network interface, Mobile WiMax interface, DVB-H interface, RFID interface, GPS interface or other wireless protocol interface;
an interface capable of displaying a representation of relative performance of the wireless technology interfaces; and
an adjustment mechanism which allows for the adjustment of the performance of at least a first one of the wireless technology interfaces, the performance being adjustable and being based upon at least one of power, noise, interference and signal quality
wherein the effect of the adjustment of the performance of at least a first one of the wireless technology interfaces on the performance of at least one other wireless technology interface is also simultaneously displayed on the interface.

23. The apparatus of claim 22, wherein the interface is a graphical display.

24. The apparatus of claim 23, wherein the adjustment mechanism is sliders.

25. The apparatus of claim 22, wherein the interface allows for applying the adjustments made with the adjustment mechanism to the wireless technology interfaces.

26. The apparatus of claim 22, wherein interface allows for locking a preset performance level to the displayed adjusted performance.

* * * * *